A. N. HADLEY.
SHOCK LIFTER.
APPLICATION FILED JULY 7, 1909.
Reissued Dec. 27, 1910.
13,187.
2 SHEETS—SHEET 1.
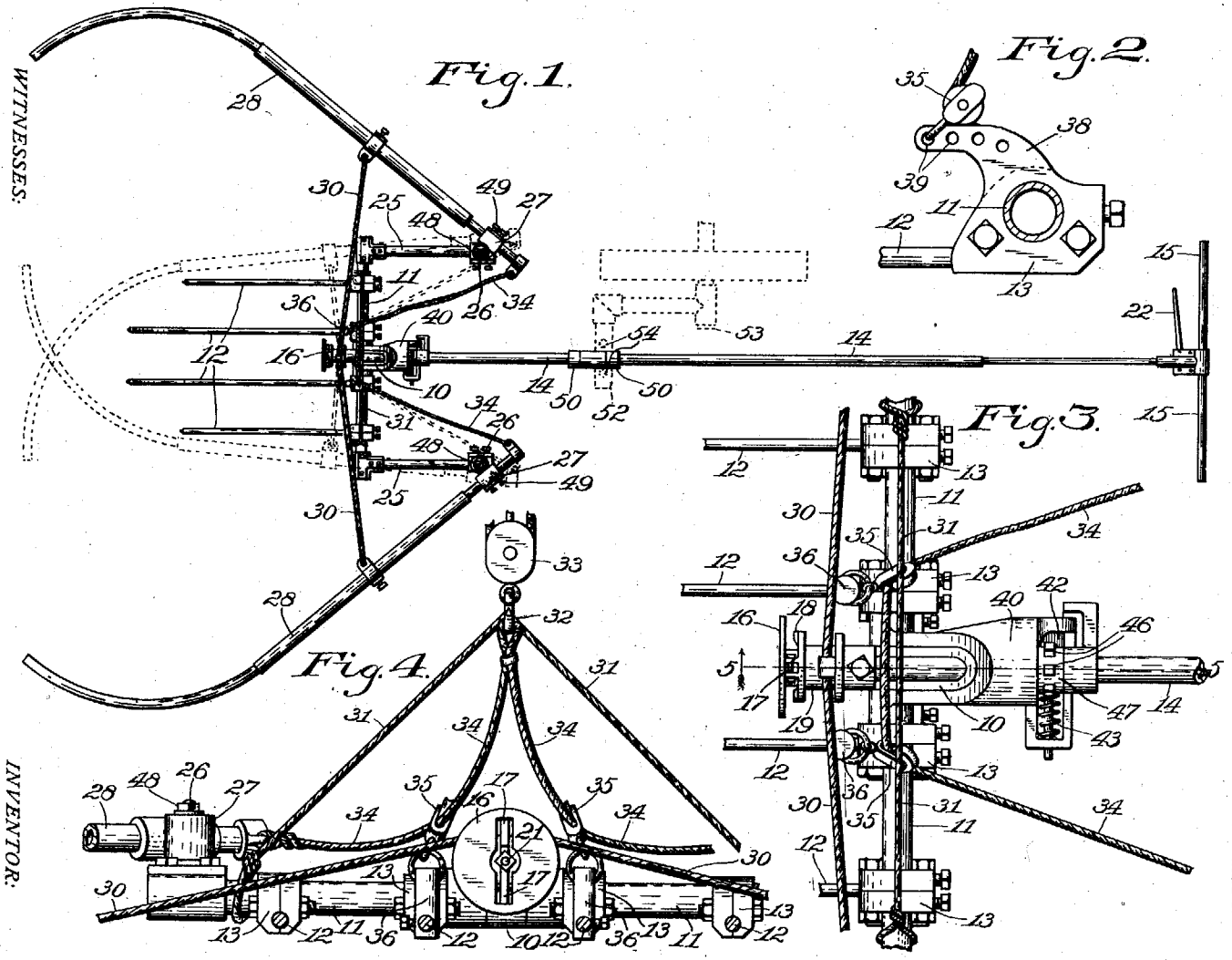
WITNESSES:
J. H. Gardner.
K. R. Woddell.
INVENTOR:
Artemus N. Hadley,
BY
E. T. Silvius,
ATTORNEY.
THE NORRIS PETERS CO., WASHINGTON, D. C.

A. N. HADLEY.
SHOCK LIFTER.
APPLICATION FILED JULY 7, 1909.
Reissued Dec. 27, 1910.
13,187.
2 SHEETS—SHEET 2.
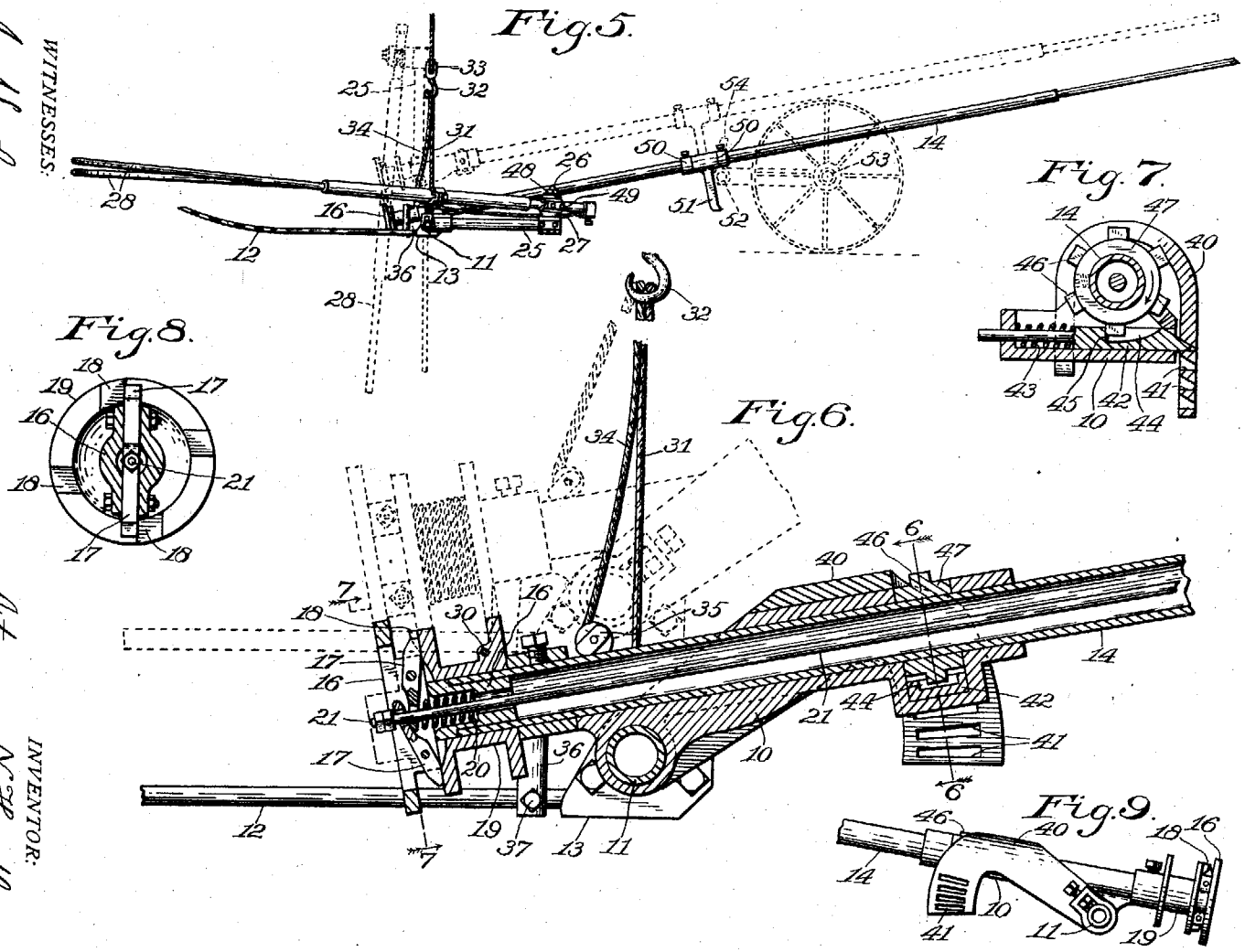
WITNESSES:
J. H. Gardner.
K. R. Woddell.
INVENTOR:
Artemus N. Hadley
BY
E. T. Silvius,
ATTORNEY
THE NORRIS PETERS CO., WASHINGTON, D. C.

UNITED STATES PATENT OFFICE.

ARTEMUS N. HADLEY, OF INDIANAPOLIS, INDIANA.

SHOCK-LIFTER.

13,187. Specification of Reissued Letters Patent. Reissued Dec. 27, 1910.

Original No. 886,123, dated April 28, 1908, Serial No. 262,841. Application for reissue filed July 7, 1909. Serial No. 507,137.

*To all whom it may concern:*

Be it known that I, ARTEMUS N. HADLEY, a citizen of the United States, residing at Indianapolis, in the county of Marion and State of Indiana, have invented certain new and useful Improvements in Shock-Lifters, of which the following is a specification.

In the handling of a corn crop it is desirable that entire shocks of corn may be lifted bodily from the field into a wagon in order that the shocks may be readily transferred to the shredder.

The principal object of my present invention is to provide a device by means of which an entire shock may be engaged in such a manner that it may be lifted bodily by any suitable derrick or crane, such for instance, as that shown in my pending application, Serial No. 448,929.

Another object of the invention is to provide improved grappling and lifting apparatus for handling corn-shocks or other substance, and that will be so constructed that parts thereof may be readily disconnected therefrom, or may be omitted in construction thereof, in order to adapt the apparatus to be used as non-grappling apparatus for lifting and loading manure expeditiously into manure-spreaders or into wagons, or to be used for lifting or loading other substance, such as hay, or straw.

With the above-mentioned and other objects in view, the invention consists in improved lifting apparatus including a fork of novel construction, novel means for controlling the fork, and a grapple of novel construction connected detachably with the fork and adapted to coöperate therewith; and the invention consists further in the novel parts and combinations and arrangements of parts, as hereinafter particularly described and then defined in the accompanying claims.

The accompanying drawings illustrate the preferred construction of my invention.

Figure 1 is a plan; Fig. 2, a detail of a modification; Fig. 3, a fragmentary plan showing the principal portions of the apparatus on an enlarged scale; Fig. 4, a fragmentary front elevation of the apparatus shown in the preceding figure, parts thereof being in transverse section; Fig. 5, a side elevation of the apparatus; Fig. 6, a section on the line 5 5 in Fig. 3; Fig. 7, a section on the line 6 6 in Fig. 6; Fig. 8, a section on the line 7 7 in Fig. 6, and Fig. 9, a fragmentary elevation of the side opposite to that shown in Fig. 6, and on a somewhat smaller scale.

Similar reference characters in the various figures of the drawings indicate corresponding elements or features of construction referred to herein.

In the drawings, 10 indicates a main head in which is journaled a transverse shaft or prong member 11 to which is secured a plurality of shock-entering prongs or tines 12, each of said prongs or tines being secured to the shaft or prong member 11 by means of a suitable clamping head 13, and comprising parts of a fork.

Journaled in the main head 10, at right angles to the shaft 11, and extending to the rear a suitable distance, is a hollow handle member 14 which, at its rear end, is provided with a transverse handle bar 15. The forward end portion of the member 14 carries a head 16, in which are pivoted two dogs 17, the outer ends of which are adapted to engage teeth 18 formed upon the forward end of a winding drum 19 journaled on the forward end portion of the handle member 14. The dogs 17 are normally held in engagement with the teeth 18 by means of a light spring 20, and said dogs may be retracted from engagement with teeth 18 by means of a rod 21 which extends through the adjacent over-lapping inner ends of the dogs 17, and through the handle member 14 to a point adjacent the handle bar 15 where said rod is connected to the operating lever 22.

Secured to each one of the two ends of shaft 11 beyond prongs 12, is a rearwardly projecting arm 25, which at its rear end carries an upwardly projecting pin 26 upon which is pivoted a box 27. Extending through and secured to each box 27 is a forwardly extending curved shock-embracing arm 28 which is thus adapted to swing upon the vertical pin 26 and to be rotated about the shaft 11 by reason of the movement of arm 25 therewith. Extending from drum 19 to each of the two arms 28 at a point in front of the pivot pin 26 is a cable 30, by means of which the two arms 28 may be brought toward each other as indicated in dotted lines in Fig. 1.

The weight of the structure is supported primarily by means of a rope 31, the ends of which are attached to shaft 11 near its outer ends, and the bight of which is adapted to be received in the hook 32 of the snatch block 33. The bight of a rope 34 is also attached to the hook 32 and each end of said rope is passed through one of two snatch-blocks 35, and from thence to the rear end of one or the other of the arms 28. The snatch-blocks 35 are connected operatively to the shaft 11 forward of its axis, so that any pull upon these blocks will tend to hold the outer ends of the prongs 12 up. In some cases each snatch-block 35 is connected practically with the shaft 11 by connecting it to a lug 36 which is secured adjustably to an adjacent prong 12 by a set-screw 37. Or, if desired, the clamping heads 13 may each be provided with an arm 38 in which are a plurality of holes 39 in either one of which the snatch-block may be connected to the arm, as in Fig. 2, so as to support the apparatus at points either near to or relatively farther forward of the axis of the shaft or prong member 11.

Secured to the shaft 11 with its arms straddling the main head 10 is a yoke 40 which is provided with a down turned portion having a plurality of pawl receiving notches 41 therein, any one of which is adapted to receive the end of a sliding pawl 42 mounted in the head 10 so as to slide transversely with relation to the hollow handle member 14, being normally urged into one of the notches 41 by means of a light spring 43. The pawl 42 has on its upper surface a notch 44 terminating in a shoulder 45 adapted to be engaged by any one of a series of lugs 46 on a collar 47 secured to the hollow handle member 14, arrangement being such that rotation of the hollow handle member in the direction indicated by the arrow in Fig. 7 (which is the direction of rotation necessary for "winding up" the winding drum 19 so as to bring the arms 28 together) the lugs 46 will pass into notch 44, engage shoulder 45, and retract pawl 42, but reverse rotation of the handle member is prevented by engagement of the adjacent lug 46 with the top of the pawl 42.

The boxes 27 are each retained on its pivot-pin 26 preferably by a nut 48 which when removed permits the box to be removed, so that the arms 28 and the boxes may be removed from the arms 25, if desired. Also, the arms 28 are each secured to the box 27 preferably by means of set-screws 49, so that the arms may be adjusted in the boxes in order to increase or decrease the leverage for swinging the arms on their pivots 26; and obviously the arms 28 may be disconnected from the boxes, if desired. When the arms 28 are disconnected from the arms 25, the cable 30 also may be disconnected from the winding-drum 19, and the remaining structure may be used as a powerful fork for lifting various substances, particularly for loading manure, in which case the cable 34 may be connected to the ends of the arms 25, with slack in the cable eliminated, as is obvious, and clearly also, the winding drum and its latching devices may be omitted in construction of the simple lifting fork.

The apparatus described may be used in connection with any derrick structure, but I prefer to use a wheeled structure, such, for instance, as that shown in my above mentioned pending application which can be used to force the prongs 12 of the fork into the shocks if desired. For this purpose I sleeve upon the hollow handle member 14, between a pair of collars 50 secured thereto, a hanging finger 51 adapted to be engaged by a member 52, shown by dotted lines, carried by the derrick structure 53, said structure being clearly illustrated by means of dotted lines to indicate the adjacent supporting wheel thereof. For convenience, the member 52 of the derrick should carry a pair of upright pins 54 between which the handle member 14 may be passed.

In operation, the apparatus is supported from the snatch-block 33 by the cable 31 and the grappling or shock-embracing arms 28 normally are extended, as shown in Fig. 1. The shaft 11 is also swung so that the prongs 12 will lie substantially horizontally, being held in that position by means of the pawl 42. The prongs 12 are supported a suitable distance from the ground and substantially parallel therewith, and by exerting sufficient force upon the structure these prongs may be driven into a shock, preferably near its butt. The operator then turns the handle member 14 in the direction indicated by the arrow in Fig. 7, whereupon the cable 30 is wound upon the drum 19 and the arms 28 brought together so as to embrace the shock, as indicated in dotted lines in Fig. 1. During this operation the pawl 42 is repeatedly withdrawn from engagement with the yoke 40 by the action of successive lugs 46 but, as the shock still rests upon the ground there is no tendency to shift the shaft 11 within the head 10. As the arms 28 are drawn together the slight slack in the cable 34 is taken up and the weight of the structure thereupon transferred from cable 31 to cable 34, so that there is a tendency to return the arms 28 to initial or open position, this tendency being resisted, however, by the cable 30 which has been wound upon the drum 19. As soon as a lifting pull is exerted upon the snatch-block 33 the entire shock may be lifted and transferred to any desired point of deposit, and when this point of deposit is reached the operator turns handle member 14 slightly in the direction indicated by the arrow in Fig. 7, so as to retract pawl 42 from engagement with yoke 40, thus releasing shaft 11 so that it, together with shock embracing arms 28 and prongs 12, may be turned in the position indicated by dotted lines in Fig. 5. Simultaneously with the withdrawal of the pawl 42, as described, the operator will swing the lever 22 so as to withdraw the lugs 17 from engagement with the teeth 18 and, as the weight of the structure together with the shock, is supported by cable 34, said cable operates to automatically swing arms 28 to an open position and the shock is, therefore, turned upon its side and dropped off of the prongs 12. As soon as the weight of the shock is withdrawn from the prongs 12, however, the weight of the structure, acting as it does upon cable 34 and through it upon the snatch-blocks 35 which are forward of the axis of shaft 11, automatically swings the prongs 12 upward to normal position.

When the grappling arms 28 are omitted from the structure and the apparatus adapted to be used as a dumping fork for loading manure, etc., the operations of the several parts for controlling the prongs 12, and the movement of the prongs, will be substantially as above described with reference thereto.

I claim as my invention:

1. A shock lifter including a main head, a shaft rotatably mounted therein, shock-entering prongs carried by said shaft, releasable means for holding said shaft in one position, and shock embracing means cooperating with said prongs.

2. A shock lifter including a main head, a prong member movably mounted on said main head, releasable means for holding said prong member in one position on said main head, and shock-embracing means carried by the prong member.

3. A shock lifter including a main head, a prong-member movably mounted on said main head, releasable means for holding said prong-member in one position on said main head, shock-embracing arms carried by the prong-member, means for drawing said shock-embracing arms about a shock, and releasable means for holding said arms in embracing position.

4. A shock lifter including a main head, a prong member journaled thereon so as to swing in a substantially vertical plane and provided with prongs, a pair of shock-embracing arms pivotally mounted on the prong member so as to swing in a substantially horizontal plane, releasable means for holding the prongs of the prong-member in a substantially horizontal plane, means for swinging the embracing arms to embrace a shock, and releasable means for holding said arms in embracing position.

5. A shock lifter including a main head, a prong shaft journaled therein on a substantially horizontal axis, shock-entering prongs carried by said shaft, a pair of shock-embracing arms pivotally mounted upon supports carried by the prong shaft and arranged to swing in a substantially horizontal plane, a winding drum carried by means of the main head, a cable connecting said winding drum with the embracing arms to draw said arms to embracing position, a second cable having its ends attached to the shock embracing arms beyond the pivots thereof and its middle arranged to be engaged by means for supporting the entire structure, means for winding said drum, releasable means for holding said drum, and releasable means for holding the prongs in a substantially horizontal plane.

6. A shock lifter including a main head, a prong shaft journaled therein on a substantially horizontal axis, shock-entering prongs carried by said shaft, a pair of shock-embracing arms pivotally mounted upon supports carried by the prong shaft and arranged to swing in a substantially horizontal plane, a handle member journaled in the main head and extending to the rear, a winding drum journaled on the forward portion of said handle member, releasable clutch mechanism between said handle member and winding drum, a cable attached to said winding drum and to the shock-embracing arms in front of the pivots thereof, mean by which the structure may be suspended, and a cable having its ends attached to the shock-embracing arms to the rear of the pivots thereof and extending through devices connected to the prong shaft in front of the axis thereof, and from thence to the suspending means, substantially as and for the purpose set forth.

7. A shock lifter including a main head, a prong shaft journaled therein on a substantially horizontal axis, shock-entering prongs carried by said shaft and extending forward therefrom, a catch mounted upon the main head, means carried by the prong shaft for engagement with said catch, a handle member journaled in the main head and extending to the rear, means carried by said handle member for operating the catch, a winding-drum journaled on the forward portion of the handle member, a separable clutch between said handle member and the winding-drum, means extending to the end of the handle member for operating said clutch, shock-embracing arms supported pivotally by means of said prong shaft, and a cable connected to the winding drum and also to the shock-embracing arms.

8. A shock lifter comprising a main head, a prong shaft journaled therein on a substantially horizontal axis, shock-entering prongs carried by said shaft and extending forward therefrom, a catch mounted upon the main head, means carried by the prong shaft for engagement with said catch, a hollow handle member journaled in the main head and extending to the rear, means carried by said handle member for operating the catch, a winding drum journaled on the forward portion of the handle member, a separable clutch between said handle member and said drum, a rod extending to the rear through said hollow handle member and connected at its forward end to said clutch and at its rear end to an operating lever, a pair of arms carried by the prong shaft and extending rearward, a pair of shock embracing arms pivotally mounted upon said rearward-extending arms to swing in a plane substantially at right angles to the plane of swing of the prongs, a cable attached at its ends to the shock-embracing arms forward of the pivots thereof and at its middle attached to said drum, a second cable 34 attached at its ends to the shock-embracing arms to the rear of the pivots thereof, guide blocks 35 through which said last mentioned cable is passed and by which said cable is connected to the prong shaft in front of the axis thereof, and a cable 31 connected to said shaft, the middle of said cable 31 and the middle of the cable 34 that is attached to the rear ends of the shock-embracing arms being brought together for a reception in a supporting means.

9. In a shock-lifter, a head having a controlling handle, means for carrying the head, a pair of curved arms pivotally supported by means of the head, means connected with the handle and the arms for drawing the arms each toward the other for embracing a shock, and prongs carried by the head to cooperate with the arms for lifting the shock.

10. In a shock-lifter, a head having a controlling handle, a plurality of prongs and also a pair of curved arms mounted movably on the head, means for lifting the head and having means connected therewith for moving the arms apart, and means connected with the handle and the arms for drawing the arms each toward the other to coöperate with the prongs.

11. In a shock-lifter, a head having a controlling handle, means for carrying the head, prongs supported by the head for entering a shock, a finger mounted on the handle to be engaged for forcing the prongs into the shock, a pair of curved arms supported by means of the head for embracing the shock, and means connected with the handle and the arms for drawing the arms each toward the other for embracing the shock.

12. In a shock-lifter, a head having a shaft and also an operating handle journaled therein, prongs carried by the shaft, means for supporting the head, a pair of arms pivotally supported by means of the head for embracing a shock, means for moving the arms apart, holding means controlled by the handle for temporarily maintaining the prongs in pre-determined positions relatively to the arms, movable means connected with the handle and the arms for drawing the arms each toward the other to embrace the shock, and means connected with the handle for actuating the holding means to release the prongs for permitting the prongs to move from the pre-determined positions for releasing the shock.

13. In lifting apparatus, a head having a rotative controlling handle, a shaft mounted to rotate in the head, prongs mounted on the shaft, a pawl mounted movably in the head and normally projected therefrom, a collar secured to the handle and having lugs thereon for engaging and retracting the pawl, a yoke secured to the shaft and having notches therein to receive the pawl, and a finger mounted rotatably on the handle to be engaged for forcing the prongs forward.

14. In lifting apparatus, a head, a controlling handle and also a shaft mounted rotatively at angles one to the other in the head, prongs carried by the shaft and extending forward therefrom, a latching device mounted on the head, means carried by the shaft for engagement with the latching device, means connected with the handle for actuating the latching device, and a supporting cable connected to the shaft remote from the head.

15. In lifting apparatus, a head, a shaft mounted to rotate on the head, prongs mounted on the shaft, a handle member mounted to rotate on the head and extending rearward of the shaft, a yoke secured to the shaft and extending rearward therefrom near the handle member, the yoke having pawl-receiving notches therein, a pawl mounted in the head and spring-pressed to enter the notches, and a collar secured to the handle member and having lugs thereon to engage and withdraw the pawl from the notches.

16. In shock-lifting apparatus, a head, a controlling handle mounted movably in the head, a shaft mounted in the head and having two supporting arms thereon that project rearward at opposite sides of the plane of the handle, two shock-embracing arms, each mounted pivotally on a different one of the supporting arms and extending forward, means connected with the handle for drawing the shock-embracing arms about a shock, and releasable means controlled by the handle for holding said arms in embracing position.

17. In shock-lifting apparatus, a head, a controlling handle mounted rotatively in the head, a shaft mounted on the head and having two supporting arms thereon that extend rearward substantially at opposite sides of the handle, two shock-embracing arms, each mounted pivotally on a different one of the supporting arms, a winding drum journaled on the forward portion of the handle, releasable clutch mechanism between said handle and winding drum, a cable connected to said winding drum and to the shock-embracing arms forward of the pivots thereof, and a cable having its ends attached to the shock-embracing arms rearward of the pivots thereof and extending through guiding devices connected to the shaft.

18. In shock-lifting apparatus, a head, a shaft mounted on the head and having two pivotal supports thereon, two curved shock-embracing arms mounted pivotally between their ends on the pivotal supports, an arm on each support, a hollow handle member journaled in the main head and extending rearward, a winding-drum journaled on the forward portion of the handle member, a separable clutch between said handle member and said winding-drum, a rod extending through said hollow handle member and connected with said clutch, a cable connected to the winding-drum and also to the shock-embracing arms forward of the pivots thereof, guides mounted on the structure, and a cable connected to the shock-embracing arms rearward of the pivots thereof and extending through the guides.

19. In shock-lifting apparatus, a head having a controlling handle, means for carrying the head, a pair of curved shock-embracing arms pivotally supported between their ends by means of the head, means connected with the handle and also with the arms forward of the pivots thereof for drawing the arms each toward the other for embracing a shock, and means connected with the arms rearward of the pivots thereof and coöperating with the structure for spreading the arms apart, with means carried by the head to coöperate with the arms for lifting the shock.

20. In lifting apparatus, a head, a pair of curved shock-embracing arms pivotally supported by means of the head, movable means carried by the head to coöperate with the arms for lifting a shock, a controlling handle mounted in the head and provided with a finger in proximity to the head to be engaged for forcing the apparatus forward, means connected with the arms for drawing the arms each toward the other for embracing a shock, and means connected also with the arms for spreading the arms apart, with means for controlling the movable means.

In witness whereof, I have hereunto set my hand in presence of two witnesses.

ARTEMUS N. HADLEY.

Witnesses:
P. A. Havelick,
E. T. Silvius.